3,743,743
DITHIOCARBAMYLACETONEOXIME CARBAMATE ACARICIDES AND INSECTICIDES

Arnold D. Gutman, Berkeley, Calif., assignor to Stauffer Chemical Company, New York, N.Y.
No Drawing. Original application Mar. 18, 1969, Ser. No. 808,342, now Patent No. 3,642,856. Divided and this application Sept. 3, 1971, Ser. No. 177,811
Int. Cl. A01n 9/12
U.S. Cl. 424—300    3 Claims

ABSTRACT OF THE DISCLOSURE

Dithiocarbamylacetoneoxime carbamates having the general formula

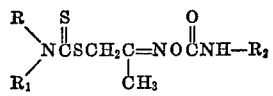

in which R and $R_1$ are independently methyl or ethyl, and $R_2$ is lower alkyl, preferably methyl. The compounds are useful as acaricides and insecticides.

---

This is a division of application Ser. No. 808,342, filed Mar. 18, 1969.

This invention relates to certain novel compounds and their utility as acaricides and insecticides. The compounds are dithiocarbamylacetoneoxime carbamates. The compounds are of particular interest because they are non-phosphorus-containing compounds which have acaricidal and insecticidal properties. More specifically, this invention relates to compounds of the formula

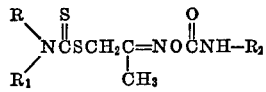

wherein R and $R_1$ are independently methyl or ethyl and $R_2$ is lower alkyl having from 1 to about 4 carbon atoms inclusive, preferably methyl. Also included is a method of preparing, using and applying said compositions.

The compounds of this invention can be prepared by one of several different methods depending upon the nature of the starting materials. One such method employed in preparing the compounds is the condensation of an appropriately substituted dithiocarbamylacetone and hydroxylamine hydrochloride to prepare the intermediate dithiocarbamylacetoneoxime. This material is then reacted with a lower alkyl isocyanate, such as methyl isocyanate, to prepare a dithiocarbamylacetoneoximino-N-lower alkyl carbamate such as dithiocarbamylacetone-oxime-N-methyl carbamate. This reaction proceeds readily in the liquid phase. The employment of an inert organic solvent is also useful, facilitating processing as well as agitation of the reactants.

It has been found that the compounds of the present invention are particularly effective as acaricides and insecticides.

The preparation of compounds of the present invention is more particularly illustrated by the following examples:

EXAMPLE I

Preparation of N,N-dimethyldithiocarbamyl-acetoneoxime intermediate

In a 500 ml. three-neck flask fitted with a thermometer, stirrer and dropping funnel, 17.7 gm. (0.1 mole) of N,N-dimethyldithiocarbamylacetone and 7.6 gm. (0.11 mole) of hydroxylamine hydrochloride are combined in a solution of 30 ml. ethanol in 300 ml. of water. The mixture is rapidly stirred and a solution of 7.5 gm. (0.06 mole) sodium carbonate monohydrate in 25 ml. of water is added over a period of 15 minutes. After the addition is complete, the mixture is stirred at room temperature for two hours. The reaction mixture is then poured into 300 ml. of water. The aqueous mixture is extracted with 3–100 ml. portions of $CHCl_3$. The $CHCl_3$ solution is dried with anhydrous magnesium sulfate and evaporated under reduced pressure. There is obtained 15.8 gm. (82.5% of theory) of N,N-dimethyldithiocarbamyl-acetoneoxime, a low melting solid.

EXAMPLE II

Preparation of N,N-dimethyldithiocarbamyl-acetoneoximino-N'-methyl carbamate 15.6 gm. (0.0813 mole) of N,N-dimethyldithiocarbamylacetoneoxime and 25 ml. of acetone are combined and stirred. 5.7 gm. (0.1 mole) of methyl isocyanate is added at such a rate that the temperature does not exceed 30° C. After the addition is complete, the mixture is stirred at room temperature for one hour, then poured into 300 ml. of benzene. The benzene solution is washed with three 150 ml. portions of water, dried with anhydrous magnesium sulfate and evaporated under reduced pressure. There is obtained 20.0 gm. (98.5% of theory) of N,N-dimethyldithiocarbamylacetoneoximino-N'-methyl carbamate, $N_D^{30}=1.5845$.

EXAMPLE III

Preparation of N,N-diethyldithiocarbamyl-acetoneoximino-N'-methyl carbamate

In a similar manner as Example II, employing 9 gm. (0.041 mole) of N,N-diethyldithiocarbamylacetoneoxime, there is obtained 10 gm. (88% of theory), of N,N-diethyldithiocarbamylacetoneoximino-N'-methyl carbamate, $N_D^{30}=1.5700$.

As previously mentioned, the herein described compositions produced in the above-described manner are biologically active compounds which are useful and valuable in controlling acarids. The compounds of this invention are tested in the following manner: Compound numbers, hereinafter mentioned, correspond to the example numbers in which the preparation of the compound is described, supra.

Acaricidal evaluation test: Two-spotted mite, *Tetranychus telarius* (Linn.) is employed in tests for miticides. Young pinto bean plants in the primary leaf stage are used as the host plants. The young pinto bean plants are infested with several hundred mites. Dispersions of candidate materials are prepared by dissolving 0.1 gram in 10 ml. of a suitable solvent, usually acetone. Aliquots of the toxicant solutions are suspended in water containing 0.0175% v./v. Sponto 221® (polyoxy-ethylene ether of alkylated phenols blended with organic sulfonates), an emulsifying agent, the amount of water being sufficient to give concentrations of active ingredient ranging from 0.05% to 0.0008%. The test suspensions are then sprayed on the infested pinto bean plants. After seven days, mortalities of post-embryonic and ovicidal forms were determined. The percentage of kill is determined by comparision with control plants which are infested but not sprayed with the candidate compounds. The $LD_{50}$ value is calculated using well-known procedures. The compound of Example II has an $LD_{50}$ of 0.03% against the post-embryonic form of the mite species and 0.03% against the mite eggs.

Aphid evaluation test: The compounds are also active against bean aphid (*Aphis fabae* (Scop.)) as a contact toxicant. The same test procedure and solution formulation as given for the two-spotted mite test above is used for the aphid test. Nasturtium (*Tropaeolum* sp.) plants approximately two to three inches tall are used as the host plant. Several hundred aphids are used to infest the plants. The treated plants are held for two days before mortalities of the aphids is determined. The percentage kill is determined by comparison with untreated infested plants. The $LD_{50}$ value is calculated. The compound of Example II has an $LD_{50}$ against bean aphid of 0.01% and the compound of example number III has an $LD_{50}$ value against bean aphid of 0.03%.

The concentration of a compound of the present invention constituting an effective amount of the best mode of administration to an insect or acarid pest or its habitat may be easily determined by those skilled in the art of pest control, as exemplified by the procedures described hereinabove. In practice, the compounds are formulated with an inert carrier utilizing methods well-known to those skilled in the art, thereby making them suitable for application as dusts, sprays, trenches and the like. Organic solvents, such as aliphatic and alicyclic ketones, hydrocarbons such as benzene, xylenes, toluene, petrols, furthermore, chlorinated and fluorinated hydrocarbons such as chlorobenzenes, are particularly suitable for preparation of solutions. The active substances according to the invention may also be applied in aqueous preparations, such as, for example, dispersions (emulsions and suspensions). For the preparation of an emulsion, the substances are homogenized in water in one of the above-mentioned solvents, preferably in the presence of a dispersing agent. Cationic, anionic and nonionic preparations my be mentioned as dispersing agents or emulsifiers, for example, quaternary ammonium compounds, soaps, alkali and earth alkaline salts of long-chain aliphatic sulfuric acid monoesters, and poly-ethylene glycol ethers of fatty alcohols or alkyl phenols. Film-forming and adhesion agents may furthermore be added to the emulsions or dispersions. For dusts and scattering agents, the active substances are added in various ways to finely ground or granulated carriers which may be inert, acid or alkaline. The carriers may be impregnated with the solutions of the active substances as described above. Inorganic substances, such as silicates, bentonites, zeolites, kieselguhr, diatomaceous earth, glass powder, talc, boric acid, tricalcium phosphate and in some cases calcium carbonate, for example, in the form of prepared chalk, quick-lime and finely-ground lime may be regarded as carriers for these forms of preparation. Organic substances such as wood meal, cork dust, walnut shell powder, or granules may serve as carriers. To insure contact with the pests, the active substances can be used with lures and baits. The biological effect may likewise be extended by adding substances containing bactericidal, fungicidal, nematocidal or their insecticidal properties.

What is claimed is:

1. A method for controlling insects and acarids which comprises applying to said insects and acarids an insecticidally or acaricidally effective amount of a compound having the formula

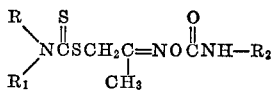

in which R and $R_1$ are independently methyl or ethyl and $R_2$ is lower alkyl having from 1 to about 4 carbon atoms, inclusive.

2. The method of claim 1 in which R, $R_1$ and $R_2$ are each methyl.

3. The method of claim 1 in which R and $R_1$ are both ethyl and $R_2$ is methyl.

References Cited
UNITED STATES PATENTS

| | | | |
|---|---|---|---|
| 3,078,306 | 2/1963 | Von Schickh et al. | 260—566 |
| 3,211,770 | 10/1965 | Pyne | 424—300 |
| 3,277,142 | 10/1966 | Zerbe et al. | 424—300 |
| 3,299,137 | 1/1967 | Payne Jr. et al. | 260—566 |
| 3,400,153 | 9/1968 | Payne Jr. et al. | 260—566 |
| 3,418,362 | 12/1968 | Adonwardene et al. | 424—300 |

ALBERT T. MEYERS, Primary Examiner

L. SCHENKMAN, Assistant Examiner